United States Patent
Michaelis

(10) Patent No.: US 8,229,105 B2
(45) Date of Patent: Jul. 24, 2012

(54) PURPOSEFUL DEGRADATION OF SIDETONE AUDIO FOR PROVIDING FEEDBACK ABOUT TRANSMIT-PATH SIGNAL QUALITY

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1069 days.

(21) Appl. No.: 12/142,991

(22) Filed: Jun. 20, 2008

(65) Prior Publication Data
US 2009/0316880 A1 Dec. 24, 2009

(51) Int. Cl.
*H04M 1/00* (2006.01)
*H04M 9/00* (2006.01)

(52) U.S. Cl. .................. 379/391; 379/392; 379/402

(58) Field of Classification Search .......... 379/338–349, 379/371, 372, 402
See application file for complete search history.

(56) References Cited

U.S. PATENT DOCUMENTS

| | | | |
|---|---|---|---|
| 7,092,513 B1 * | 8/2006 | Lashley et al. | 379/388.03 |
| 8,050,398 B1 * | 11/2011 | Xu | 379/392 |
| 2004/0174989 A1 * | 9/2004 | Michaelis | 379/391 |

* cited by examiner

*Primary Examiner* — Fan Tsang
*Assistant Examiner* — Jeffrey Lytle
(74) *Attorney, Agent, or Firm* — Sheridan Ross P.C.

(57) ABSTRACT

An enhanced sidetone system is disclosed which provides the user of a telecommunications terminal, while speaking, with immediate audio feedback that corresponds to what the far-end party is probably hearing. The sidetone system continuously samples the input speech signal from the user and also obtains signal quality statistics of the transmission path. These statistics can include descriptions of network quality-of-service characteristics (e.g., packet loss rate, etc.) and/or media quality characteristics (e.g., audio distortion due to echo cancellation, etc.). These statistics enable the disclosed technique to determine whether the transmitted signal quality is acceptable. When an unacceptable condition in transmit-path signal quality is detected, the technique modifies the traditional (main) sidetone signal. For example, a delayed sidetone signal can be transmitted back to the user's terminal, in addition to the main sidetone signal generated, so that the user perceives the combination of sidetone signals as a hollow-sounding, objectionable sound.

19 Claims, 4 Drawing Sheets

PURPOSEFUL DEGRADATION OF SIDETONE AUDIO FOR PROVIDING FEEDBACK ABOUT TRANSMIT-PATH SIGNAL QUALITY

REFERENCE TO RELATED APPLICATIONS

This application is related to U.S. application Ser. No. 12/119,984, filed May 13, 2008.

FIELD OF THE INVENTION

The present invention relates to telecommunications in general, and, more particularly, to providing information in a sidetone signal provided to a user via a receive communication path, wherein the information serves as feedback about the signal quality in the corresponding transmit communication path.

BACKGROUND OF THE INVENTION

Certain types of audio telephony are susceptible to degradations in voice quality. For example, cellular telecommunication is notorious for marginal-to-poor call quality at certain times of the day and year, and in certain geographic areas where coverage is a problem. As another example, Voice over Internet Protocol (VoIP) telecommunication has also been known to exhibit unacceptable call quality, depending on various characteristics such as how each phone gains access to the network, the audio encoding algorithms being employed, the traffic that is already present along the access paths, packet loss and delay, routing inefficiencies, and the traffic-handling capability of the network.

A common problem is that the communication path between two call participants can be afflicted with poor call quality in one direction while the other direction still has acceptable quality. This occurs frequently in asymmetric networks that provide different upload and download speeds. A more annoying problem is that asymmetric voice quality impairments can be transient, especially with VoIP systems. A reason that voice quality asymmetry can occur with VoIP systems is that, unlike traditional telephone systems, VoIP networks tend to carry both voice and data. Illustratively, if a large amount of non-voice data are moved suddenly from Point-A to Point-B, while much smaller amounts are being moved from B to A, it would not be unusual during the data transfer for the voice quality from A to B to be worse than the quality from B to A.

The annoying aspect of transient asymmetric voice quality impairments is that the speaker is often unaware of the impairment until informed of the problem by the other party. This is a situation that virtually every user of certain types of telecommunications networks (e.g., VoIP, cellular, etc.) has experienced at least once, often resulting in frustration and lost time because of the need to repeat what was said. Therefore, a need exists for an audio mechanism that will inform users, in real-time, that their voice is not being transmitted clearly to the other party or parties on the call.

SUMMARY OF THE INVENTION

It is recognized in the present invention that when a telecommunications terminal user on a call hears degradation, the user tends to change the way that he or she speaks. Typically, the user speaks more slowly or more clearly, or she tries to confirm that the second party is able to hear adequately—for example, by sporadically asking, "Can you hear me?" or "Are you still there?"

Meanwhile, it is also recognized that telephone systems have mechanisms that are intended to feed the user's voice back to the user's ear while the user is speaking. The traditional purpose of the sidetone signal is to provide feedback to the user about how loudly she is speaking, the sidetone being necessary because the telephone handset is covering one of her ears. It is well known that people tend to speak more loudly when using a telephone that has low sidetone and speak more softly when using a telephone that has loud sidetone.

Prior to the advent of digital telephones and digital switching systems, the sidetone heard by users of wired analog telephones was created within the phone itself by a circuit commonly referred to as the "sidetone hybrid." This circuit combines four wires within the phone (two for the microphone and two for the speaker) into a pair of wires that carries both the transmit and receive signals. The loudness of the sidetone varies as a function of the impedance mismatch between the telephone and its associated port on a private-branch exchange or switch.

In modern digital and Voice over Internet Protocol (VoIP) telephones, sidetone generation is controlled by software or firmware. As was the case with wired analog telephony, the objective of the sidetone mechanism in these systems is to provide users with an accurate representation of their voice while they are speaking. In some environments, especially wireless telephony and VoIP, provision of distortion-free sidetone has represented a significant engineering challenge. An important point in this context is that deliberately distorting the sidetone signal would be straightforward, if one wanted to do so. The present invention takes advantage of this capability, in order to address the problem of a user being unaware of transmission impairments while he is speaking. Specifically, the present invention relies on an enhanced sidetone mechanism to provide the user of a telecommunications terminal, while speaking, with immediate audio feedback that corresponds to what the far-end party is probably hearing.

The sidetone system of the illustrative embodiment, which is implemented at a private-branch exchange (PBX), continuously samples the input speech signal (i.e., the user's voice) and also obtains signal quality statistics of the transmission path that is in the direction from the user to the far-end party. Illustratively, these statistics might include descriptions of network quality-of-service characteristics (e.g., packet loss rate, latency, radio signal strength, radio interference, etc.) and/or media quality characteristics (e.g., audio distortion caused by poor echo cancellation, inaccurate transcoding between different digitization schemes, crosstalk, etc.) within specific time windows. The availability of these statistics enables the disclosed technique of the illustrative embodiment to determine whether the transmitted signal quality is acceptable or not.

When an unacceptable condition in transmit-path signal quality is detected, the disclosed technique modifies the traditional (main) sidetone signal, possibly by introducing additional signal components. For example, in accordance with the illustrative embodiment, a delayed sidetone signal is transmitted back to the user's terminal, in addition to the main sidetone signal that is generated either at the phone or at the PBX. The amount of delay is engineered so that the user perceives the combination of the two sidetone signals (i.e., main and delayed) as a hollow-sounding, objectionable sound. Such a sound is of the sort often described by users as "what I would sound like with my head in a rain barrel"; it is created in accordance with the illustrative embodiment by delaying the second sidetone with respect to the main sidetone by between five and twenty milliseconds. In some embodiments of the present invention, the amplitude of the second sidetone signal is adjustable, as well as the amount of delay with respect to the main sidetone, thereby allowing the degree and nature of the distortion to be varied in response to varying conditions.

In some embodiments of the present invention, a transient interruption of transmissions to the receiving party, of the sort of interruptions that occur frequently with wireless telephones, is indicated to the talking party by a corresponding, noticeable drop in sidetone amplitude. Other types of sidetone distortion that can be deliberately added include static, white or colored noise, clicks, pops, and hum.

The different types of sidetone distortion that are created in response to different types of transmission impairments, and in accordance with the illustrative embodiment, advantageously serve to inform users about the types and severity of the impairments that are occurring. This information enables users to make immediate adjustments to their speech or physical location and to determine whether what they have said has been heard clearly by the other party.

The illustrative embodiment of the present invention comprises: receiving, at a data-processing system situated in a telephony network, an input speech signal that is based on a speech input of a user at a telecommunications terminal, the input speech signal having a signal quality characteristic as measured at a point in the network other than at the telecommunications terminal; generating a primary sidetone signal that is based on the input speech signal; modifying the primary sidetone signal at the data-processing system, resulting in a modified sidetone signal that is based on one or more values of the signal quality characteristic; and transmitting the modified sidetone signal to the telecommunications terminal.

DETAILED DESCRIPTION

Figure 1:
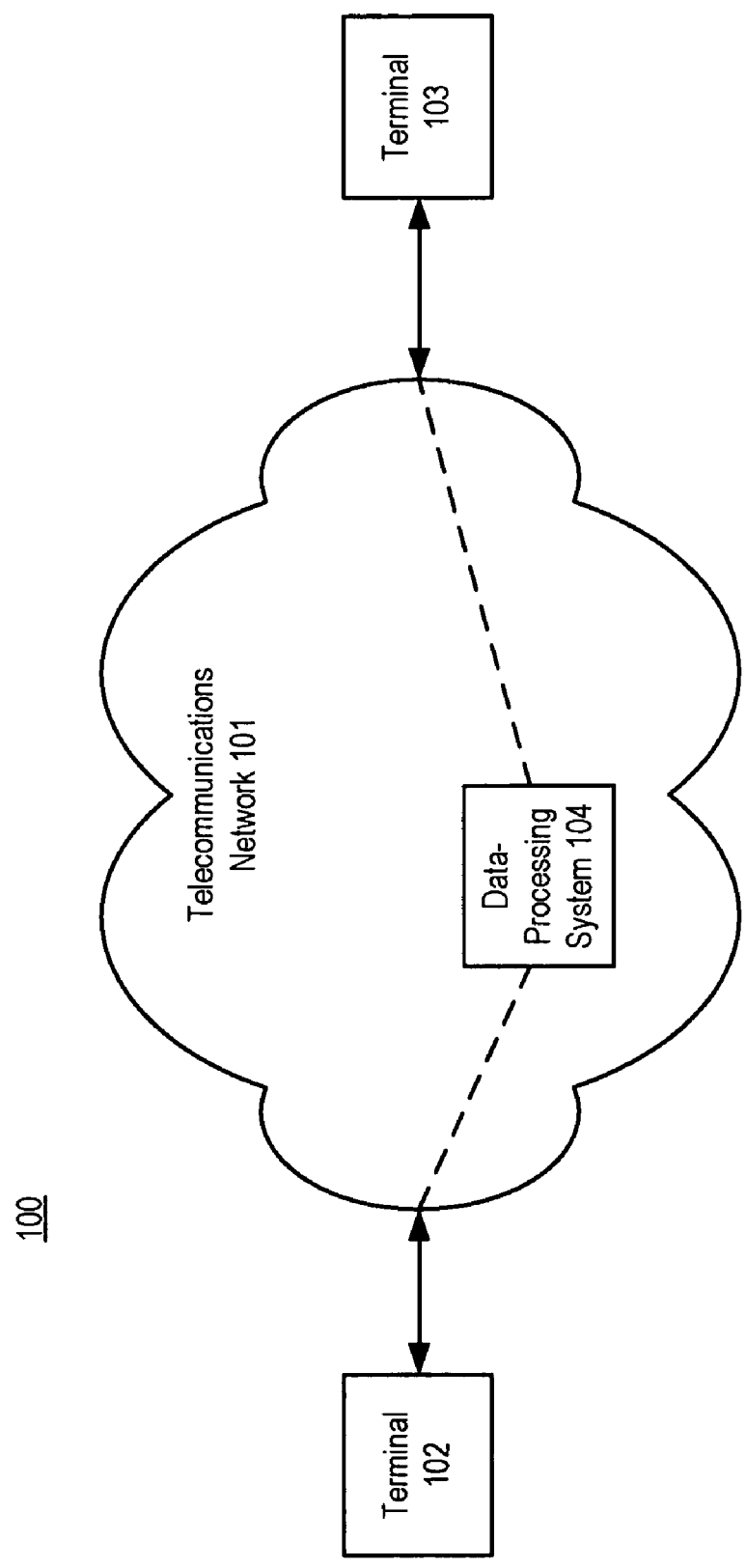
FIG. 1 depicts a schematic diagram of telecommunications system 100 in accordance with the illustrative embodiment of the present invention.

FIG. 1 depicts a schematic diagram of telecommunications system 100 in accordance with the illustrative embodiment of the present invention. System 100 comprises telecommunications network 101; first telecommunications terminal 102; and second telecommunications terminal 103. The elements in system 100 are interconnected as shown.

Telecommunications network 101 enables the transport and control of communications signals between endpoints such as terminals 102 and 103. The communications signals convey media signals, such as audio, video, and so forth. To this end, network 101 comprises one or more interconnected data-processing systems such as switches, servers, routers, and gateways, as are well-known in the art. Network 101, for example, comprises data-processing system 104, which is described below and with respect to FIG. 2.

In accordance with the illustrative embodiment, network 101 comprises an Internet Protocol-based (IP-based) network, as is known in art, for the purpose of transmitting bitstreams of encoded voice signals. Although network 101 in the illustrative embodiment comprises a Voice-over-IP (VoIP) service provider's network, network 101 could alternatively or additionally comprise another type of network such as the Internet, some other type of IP-based network, or some other type of packet-based network, as those who are skilled in the art will appreciate. Additionally, it will be clear to those skilled in the art, after reading this specification, how to make and use alternative embodiments of the present invention in which media other than audio is controlled and transported from one terminal to another.

Telecommunications terminals 102 and 103 are endpoint devices, such as desksets, cellular phones, soft phones resident in computers, personal digital assistants, and so forth. Each of terminals 102 and 103 enables their users to communicate with each other, or with users of other terminals supported by network 101 that are not depicted. Accordingly, terminals 102 and 103 interoperate with network 101 and with each other in well-known fashion.

Terminal 102, in accordance with the illustrative embodiment, is a Voice over Internet Protocol (VoIP) phone, which is particularly vulnerable to impairments in signal quality, often because of the bandwidth asymmetry of the data paths between the VoIP terminal and the network infrastructure. Moreover, the particular type of VoIP phone that is part of the illustrative embodiment, namely an enterprise deskset, operates as part of a system in which the sidetone is generated at a data-processing system, such as a private-branch exchange. However, it will be clear to those skilled in the art, after reading this specification, how to make and use alternative embodiments, in which terminal 102 is a type of digital terminal other than a VoIP phone, such as a digital cell phone, or is instead an analog terminal. It will also be clear to those skilled in the art how to make and use other alternative embodiments in which terminal 102 generates its own prior-art sidetone. And as those who are skilled in the art will also appreciate, embodiments of the present invention can be made and used in which the terminals of system 100 operate in various types of networks such as public networks, private networks, and so forth.

In accordance with the illustrative embodiment, the present invention is directed at a technique that provides, to a first user at a first terminal, feedback on the signal quality being experienced by a second user at a second terminal, wherein both users are humans. In various alternative embodiments, however, the first user might be human and the second user might be a machine, or the first user might be a machine and the second user might be human, and so forth.

Data-processing system 104 is a communications server that performs one or more functions that enable proper communication between a first and second user. The salient components of system 104 that enable this communication are described below and with respect to FIG. 2. System 104 also performs the tasks of the illustrative embodiment, the salient tasks being described below and with respect to FIGS. 3 and 4.

In accordance with the illustrative embodiment, data-processing system 104 is a private-branch exchange (PBX). As those who are skilled in the art will appreciate, however, system 104 can be a central-office switch or another type of network node.

Figure 2:
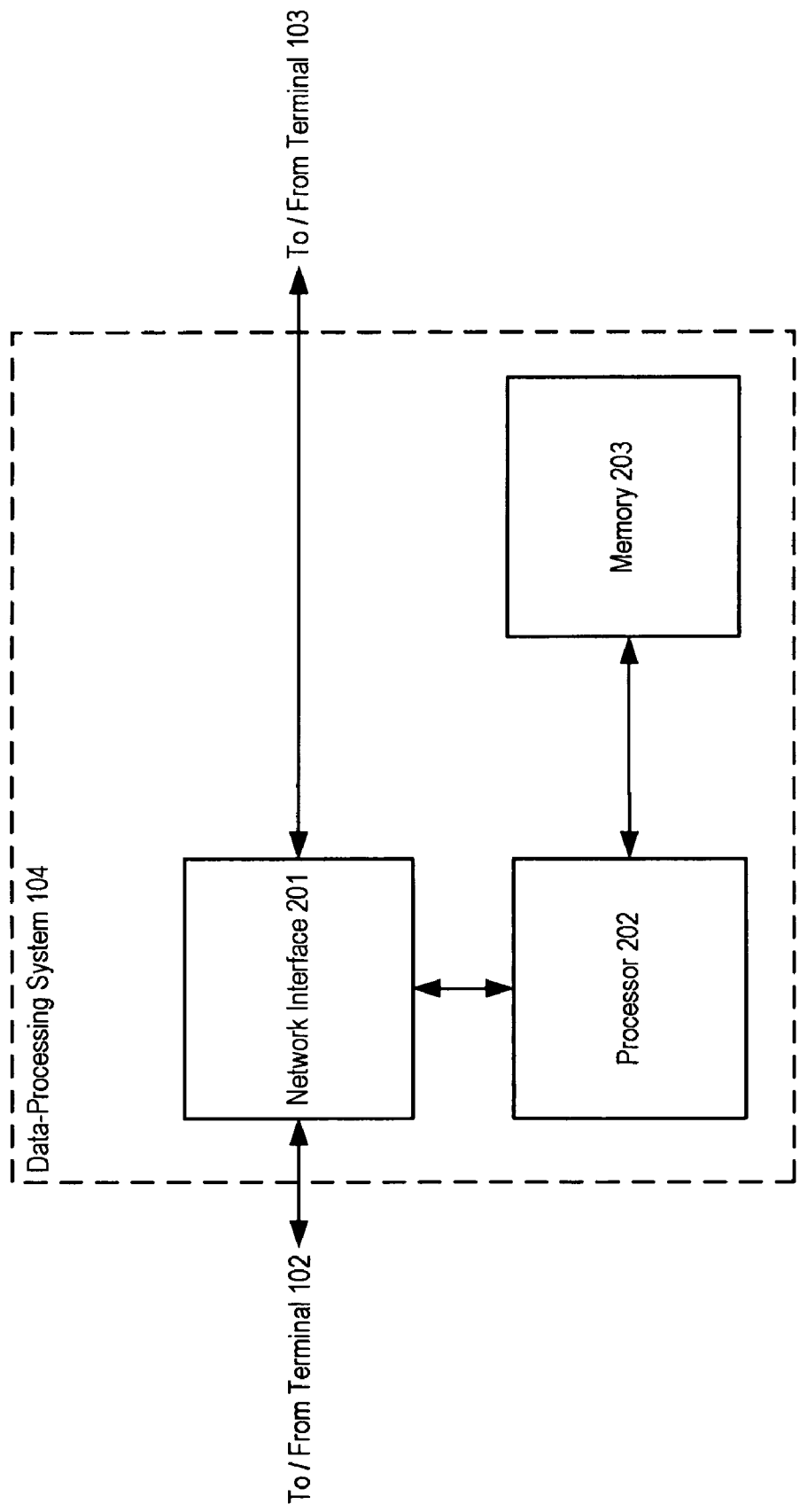
FIG. 2 depicts the salient components of data-processing system 104, which is part of telecommunications system 100.

FIG. 2 depicts the salient components of data-processing system 104, in accordance with the illustrative embodiment of the present invention. System 104 comprises network interface 201, processor 202, and memory 203, interconnected as shown. It will be clear to those skilled in the art, after reading this disclosure, how to make and use alternative embodiments of the present invention in which system 104 comprises any subcombination of the components listed above.

Network interface 201 comprises the circuitry that enables system 104 to receive signals from and transmit signals to any terminal, such as terminals 102 and 103, in well-known fashion.

Processor 202 is a general-purpose processor that is capable of receiving information from and transmitting information to network interface 201, of executing instructions stored in memory 203 including those that correspond to the tasks of the illustrative embodiment, and of reading data from and writing data into memory 203. In some alternative embodiments of the present invention, processor 202 might be a special-purpose processor.

Memory 203 stores the instructions and data used by processor 202, in well-known fashion. Memory 203 can be any combination of dynamic random-access memory (RAM), flash memory, disk drive memory, and so forth.

Data-processing system 104 is further capable of producing a "sidetone signal," as is well-known in the art, which is generated from the speech of the user of a telecommunications terminal and is then fed back to the user as she speaks. Without sidetone, a telecommunications terminal sounds dead to the user while she is speaking; this is because her ear is covered by the terminal's receiver, which impedes the acoustic path from mouth to ear.

The sidetone heard by users of wired analog telephones is created within the phone itself by a circuit commonly referred to as the "sidetone hybrid." This circuit combines four wires within the phone (two for the microphone and two for the speaker) into a pair of wires that carries both the transmit and receive signals. The loudness of the sidetone varies as a function of the impedance mismatch between the telephone and its associated port on a private-branch exchange or switch.

In certain digital telephony systems such as Voice over Internet Protocol (VoIP), sidetone generation is controlled by software or firmware at a data-processing system separate from the phone, such as system 104. As is the case with analog telephony, the objective of the sidetone mechanism in these digital systems is to provide users with an accurate representation of their voice while they are speaking.

Figure 3:
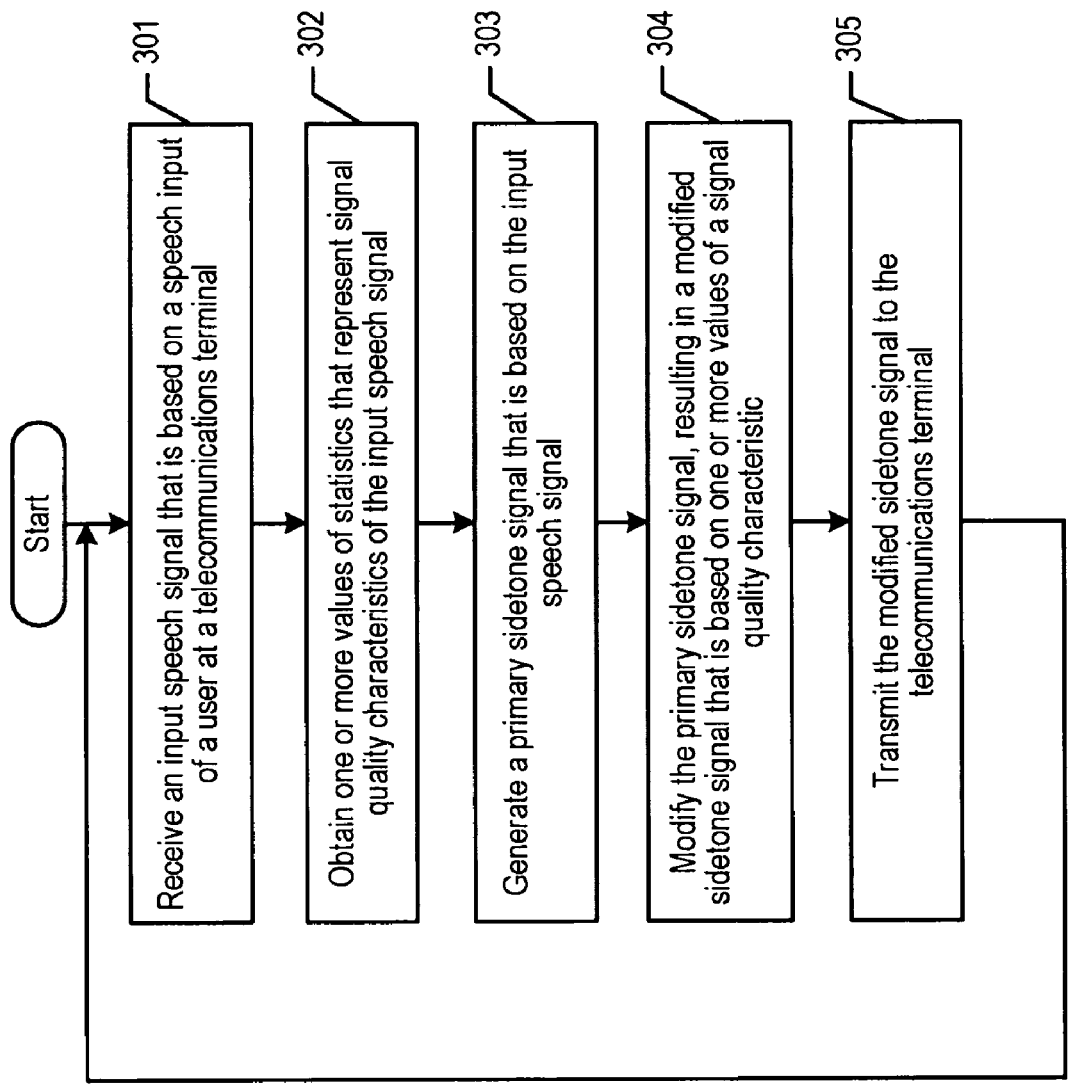
FIG. 3 depicts a flowchart of the salient tasks performed by data-processing system 104, as part of a first operating scenario, in accordance with the illustrative embodiment.
Figure 4:
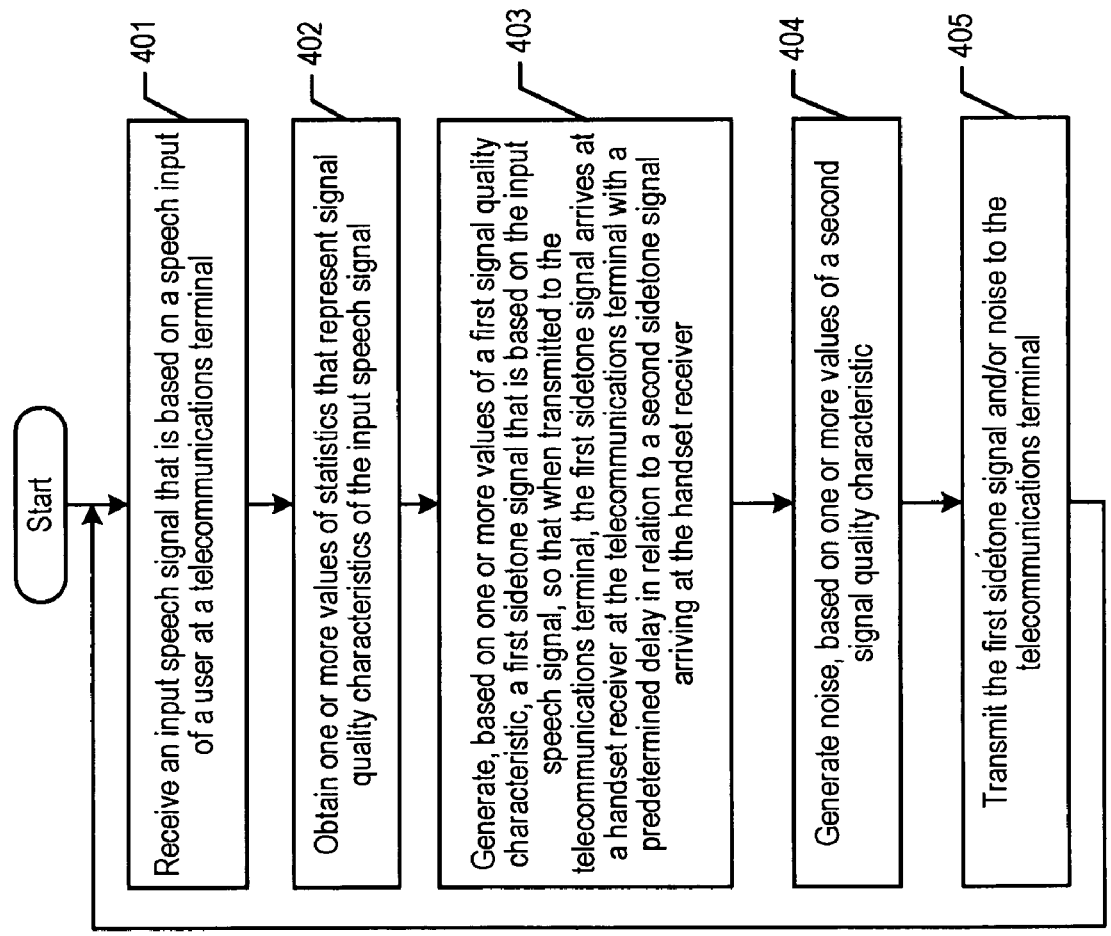
FIG. 4 depicts a flowchart of the salient tasks performed by data-processing system 104, as part of a second operating scenario, in accordance with the illustrative embodiment.

FIGS. 3 and 4 depict flowcharts of the salient tasks performed by data-processing system 104, as part of various operating scenarios, in accordance with the illustrative embodiment of the present invention. As those who are skilled in the art will appreciate, some or all of the individual tasks depicted in FIGS. 3 and 4 can be performed simultaneously or performed in a different order from that depicted.

For pedagogical purposes, examples are provided in which terminals 102 and 103 are exchanging communication signals with each other. In the first operating scenario, which is represented by FIG. 3, terminal 102 is a VoIP deskset. The signals that are being exchanged traverse data-processing system 104, which is a private-branch exchange that generates sidetone on behalf of terminal 102. In the second operating scenario, which is represented by FIG. 4, terminal 102 is a phone that generates its own traditional sidetone, such as a cell phone or a POTS analog phone. In the second operating scenario, data-processing system 104, which is a private-branch exchange, is aware that terminal 102 generates its own traditional sidetone, which can be ascertained in well-known fashion—for example, from terminal-related information that system 104 maintains in its database.

As those who are skilled in the art will appreciate, alternative embodiments of the present invention can involve, to list a few variations, the exchange of other types of media content such as video; more than two terminals communicating with one another, either as part of the same session or across multiple, simultaneous sessions; different types of telecommunications terminals than those in the illustrative embodiment; and/or a different type of data-processing system that either does or does not provide traditional sidetone.

FIG. 3 depicts a flowchart of the salient tasks performed by data-processing system 104, as part of the first operating scenario in which system 104 generates traditional sidetone. At task 301, system 104 receives an input speech signal represented in a bitstream originating from terminal 102. The input speech signal is based on a speech input of terminal 102's user. At least some of the bits in the bitstream received by data-processing system 104 are also transmitted to terminal 103 and intended for its user.

In accordance with the illustrative embodiment, the bitstream comprises audio information. In some alternative embodiments, the bitstream might comprise video information, audio and video information, or some other type of media content. In still other alternative embodiments, the bitstream might also comprise information that is already being collected by network 101 about one or more portions of the communications path from terminal 102.

At task 302, system 104 obtains (i.e., generates or receives) one or more values of quality statistics in well-known fashion, where each quality statistic obtained is based on at least a portion of the input speech signal received at task 601. Each quality statistic obtained is related to a signal quality characteristic from the general categories of i) quality of service (QoS) and ii) media waveform quality, sometimes referred to as "quality of media" (QoM). Quality statistics that are associated with quality of service are those which are a measure of the bandwidth, error rate, and/or latency from one node to another.

Quality statistics that are associated with media waveform quality are those which are a measure of how well a media signal that is received at a device compares with what is required to be received at that device, when assessed at the waveform level. A media signal can be an audio signal, a video signal, a modem traffic signal, a TTY signal, a facsimile signal, or some other signal that can be characterized as having a waveform. The device can be the intended destination of the media signal within a telecommunications system or it can be an intermediate node within the telecommunications system, such as data-processing system 104.

Waveform quality is distinguished from quality of service, in that quality of service is a measure that is performed at the bit or packet level. Waveform quality is a function of, but is not limited to, one or more of the following waveform characteristics:

i. loudness,
   ii. audio distortion,
   iii. noise,
   iv. fading,
   v. crosstalk, and
   vi. echo.

As those who are skilled in the art will appreciate, quality statistics that are generated in accordance with the illustrative embodiment can also be related to other performance characteristics that have to do with signal quality. Furthermore, in some alternative embodiments, some or all of the quality statistics can be generated from information that is already being collected about one or more portions of the communications path from terminal 102, as described above and with respect to task 301.

At task 303, system 104 generates a traditional sidetone signal in well-known fashion. For purposes of clarity, the sidetone signal generated at task 303 is referred to as the "primary" sidetone signal in the remaining tasks related to FIG. 3.

At task 304, system 104 modifies the primary sidetone signal generated at task 303, resulting in a "modified" sidetone signal. The modification of the primary sidetone signal is based on an assessment of the severity and nature of audio quality impairments in the received input speech signal, as represented by the measured signal quality characteristics described above and with respect to task 302.

In a first example of modifying the primary sidetone, if the signal quality (e.g., bit-error rate, etc.) statistics obtained by system 104 indicate that the incoming speech is degraded beyond a predetermined threshold level, the operation at task 304 adds a delayed version of the sidetone to the primary sidetone generated at task 303. As those who are skilled in the art will appreciate, the delay amount, which can be as little as a few milliseconds to be effective (e.g., 5 to 20 milliseconds, etc.), can be selected so that to terminal 102's user the modified sidetone sounds "hollow" and objectionable. A hollow-sounding sidetone might sound to the user as if she is speaking with her head inside a rain barrel, on account of the different frequency components of her voice being either emphasized or canceled out in the sidetone.

In some embodiments, different delay amounts can be used to achieve other acoustic effects (e.g., reverb, echo, etc.), as those who are skilled in the art will appreciate. Additionally, in some embodiments, the relative amplitudes of the delayed sidetone signal and the primary sidetone signal can be varied, in order to achieve additional effects.

In a second example of modifying the primary sidetone, system 104 changes the amplitude of the primary sidetone. For instance, system 104 can indicate a transient interruption of transmissions to the far-end user—an interruption of the sort that occurs frequently with wireless terminals—by imposing a corresponding, noticeable drop of sidetone amplitude according to a predetermined attenuation.

In a third example of modifying the primary sidetone, system 104 adds noise, or some other type of objectionable sound, to the primary sidetone signal when the signal quality statistics obtained by system 104 indicate that the incoming speech is degraded beyond a predetermined threshold level. Examples of noise that can be added are white noise, colored noise, clicks, pops, hum, and so forth.

In some embodiments, system 104 varies a characteristic of the noise that is added to the sidetone signal, based on how much the signal degradation exceeds the applicable predetermined threshold. For example, the amplitude or frequency bandwidth of the noise can be varied in proportion to the variation of the degree of degradation as reflected in the signal quality statistics obtained at task 302.

As those who are skilled in the art will appreciate, the components of the modified sidetone signal can be different than those described, and in various ways. First, multiple added or altered components (e.g., delayed sidetone, amplitude change, noise, other distortion, etc.) can be present in the same modified sidetone. Second, each additional component can be added to the primary sidetone based on a different threshold level for a given signal characteristic. Third, each component that is added or altered can be a function of more than one signal quality characteristic or can even be a function of a parameter other than a signal quality characteristic. And fourth, the implementation or characteristics, or both, of each addition or alteration can be based on a different signal quality characteristic from one component to another.

Conversely to modifying the primary sidetone at task 304, if the signal quality statistics indicate that the incoming speech is of an acceptable quality, as determined by the statistic being within the applicable predetermined threshold for the particular signal quality characteristic being assessed, then the operation at task 304 refrains from modifying the primary sidetone signal.

At task 305, system 104 transmits the modified sidetone signal, or the primary sidetone signal if no modification has been made, to terminal 102 for the terminal's user to hear.

Data-processing system 104 continually performs the tasks described with respect to FIG. 3 throughout the call between terminals 102 and 103, and can also perform the described set of tasks concurrently for other calls involving other terminals as well. Furthermore, system 104 can also perform the tasks bi-directionally for a given call, so that the user of terminal 103 is also provided sidetone feedback on the signal quality that is being experienced by the user of terminal 102.

FIG. 4 depicts a flowchart of the salient tasks performed by data-processing system 104, as part of the second operating scenario in which traditional sidetone is generated somewhere other than at system 104, which generates a supplemental sidetone and/or noise in accordance with the illustrative embodiment. At task 401, system 104 receives an input speech signal (e.g., in the form of a bitstream, an analog waveform, etc.) originating from terminal 102, as described above and with respect to task 301.

At task 402, system 104 obtains (i.e., generates or receives) one or more quality statistics in well-known fashion, as described above and with respect to task 302.

At task 403, system 104 generates a first sidetone signal (i.e., supplemental sidetone) based on the measured signal quality characteristic as represented by the quality statistics obtained at task 402. In accordance with the illustrative embodiment, system 104 generates the first sidetone signal so that when transmitted to the telecommunications terminal (as described below and with respect to task 405), the first sidetone signal arrives at a handset receiver at the telecommunications terminal with a predetermined delay in relation to a second sidetone signal arriving at the handset receiver. The second sidetone signal is a traditional sidetone signal that is generated for the telecommunications terminal in well-known fashion—for example, by the terminal itself.

As those who are skilled in the art will appreciate, the predetermined delay amount, which can be as little as a few milliseconds to be effective (e.g., 5 to 20 milliseconds, etc.), can be selected so that to terminal 102's user the overall sidetone—that is, the combination of the system 104-generated sidetone and the traditional sidetone generated elsewhere—sounds "hollow" and objectionable. It will be clear to those skilled in the art how to determine the sources of delay throughout telecommunications network 101, in order to implement the desired delay at the reference point of the handset receiver.

In some embodiments, different delay amounts can be used to achieve other acoustic effects (e.g., reverb, echo, etc.), as those who are skilled in the art will appreciate. Additionally, in some embodiments, the amplitude of the system 104-generated sidetone signal can be increased or decreased, in order to achieve additional effects.

Conversely to generating the supplemental sidetone at task 403, if the signal quality statistics indicate that the incoming speech is of an acceptable quality, as determined by the statistic being within the applicable predetermined threshold for the particular signal quality characteristic being assessed, then the operation at task 403 refrains from generating the supplemental sidetone signal.

At task 404, system 104 adds noise, or some other type of objectionable sound, to the sidetone signal when the signal quality statistics obtained by system 104 indicate that the incoming speech is degraded beyond a predetermined threshold level. Examples of noise that can be added are white noise, colored noise, clicks, pops, hum, and so forth. Alternatively, the noise can be introduced in the absence of any generated sidetone signal.

In some embodiments, system 104 varies a characteristic of the noise that is added to the sidetone signal, based on how much the signal degradation exceeds the applicable predetermined threshold. For example, the amplitude or frequency bandwidth of the noise can be varied in proportion to the variation of the degree of degradation as reflected in the signal quality statistics obtained at task 402.

As those who are skilled in the art will appreciate, the generated supplemental sidetone component and/or added noise component can be different than described above. Each component can be introduced based on a different threshold level for a given signal characteristic. Also, each component added or altered can be a function of more than one signal quality characteristic or can even be a function of a parameter other than a signal quality characteristic. Finally, the implementation and/or characteristics of each component introduced can be based on a different signal quality characteristic from one component to another.

At task 405, system 104 transmits the generated supplemental sidetone and/or noise to terminal 102 for the terminal's user to hear.

Data-processing system 104 continually performs the tasks described with respect to FIG. 4 throughout the call between terminals 102 and 103, and can also perform the described set of tasks concurrently for other calls involving other terminals as well. Furthermore, system 104 can also perform the tasks bi-directionally for a given call, so that the user of terminal 103 is also provided sidetone feedback on the quality that is being experienced by the user of terminal 102.

In accordance with the illustrative embodiment, system 104 affects the sidetone signal provided to the user of terminal 102, based at least in part on one or more signal quality statistics for the audio in the corresponding transmit path (i.e., in the direction from terminal 102 towards terminal 103). However, it will be clear to those skilled in the art, after reading this specification, how to make and use alternative embodiments of the present invention in which the sidetone signal is affected based on signal quality statistics for the audio transmitted over a non-corresponding path (e.g., an audio path between another pair of terminals, an audio path between terminal 102 and a third terminal, etc.).

Additionally, it will be clear to those skilled in the art, after reading this specification, how to make and use alternative embodiments of the present invention in which the sidetone signal is affected based on quality statistics for a non-audio type of media (e.g., video, etc.) that is transmitted over a signal path between two terminals (e.g., terminals 102 and 103, terminal 102 and a third terminal, two other terminals, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    receiving, at a data-processing system situated in a telephony network, an input speech signal that is based on a speech input of a user at a telecommunications terminal, the input speech signal having a signal quality characteristic as measured at a point in the network other than at the telecommunications terminal;
    generating a primary sidetone signal that is based on the input speech signal;
    modifying the primary sidetone signal at the data-processing system, resulting in a modified sidetone signal that is based on one or more values of the signal quality characteristic; and
    transmitting the modified sidetone signal to the telecommunications terminal, wherein modifying the primary sidetone signal comprises adding a delayed version of the primary sidetone signal to the primary sidetone signal when signal degradation as represented by the one or more values of the signal quality characteristic exceeds a predetermined threshold, the delayed version having a predetermined amount of delay in relation to the primary sidetone signal.

2. The method of claim 1 wherein modifying the primary sidetone signal comprises varying the amplitude of the primary sidetone signal when signal degradation as represented by the one or more values of the signal quality characteristic exceeds a predetermined threshold.

3. The method of claim 2 wherein the amplitude of the primary sidetone signal is attenuated by a predetermined factor when the signal degradation exceeds the predetermined threshold.

4. The method of claim 1 wherein modifying the primary sidetone signal comprises adding noise to the primary sidetone signal when signal degradation as represented by the one or more values of the signal quality characteristic exceeds a predetermined threshold.

5. The method of claim 4 wherein the type of noise that is added to the primary sidetone signal is based on the type of signal quality characteristic being used.

6. The method of claim 5 wherein the type of noise that is added is white noise or colored noise.

7. The method of claim 5 wherein the type of noise that is added is clicks, pops, or hum.

8. The method of claim 1 wherein the signal quality characteristic pertains to quality of service.

9. The method of claim 1 wherein the signal quality characteristic pertains to media waveform quality.

10. A method comprising:
    receiving, at a data-processing system situated in a telephony network, an input speech signal i) that is based on a speech input of a user at a telecommunications terminal and ii) for which a primary sidetone signal is generated, the input speech signal having a first signal quality characteristic as measured at a point in the network other than at the telecommunications terminal;
    adding, at the data-processing system, a delayed version of the primary sidetone signal to the primary sidetone signal when signal degradation as represented by the one or more values of the first signal quality characteristic exceeds a first predetermined threshold, the delayed version having a predetermined amount of delay in relation to the primary sidetone signal, and the adding of the delayed version resulting in a modified sidetone signal; and
    transmitting the modified sidetone signal to the telecommunications terminal.

11. The method of claim 10 further comprising attenuating the amplitude of the modified sidetone signal by a predetermined factor when signal degradation as represented by one or more values of a second signal quality characteristic exceeds a second predetermined threshold.

12. The method of claim 10 further comprising adding noise to the modified sidetone signal when signal degradation as represented by one or more values of a second signal quality characteristic exceeds a second predetermined threshold.

13. A method comprising:
receiving, at a data-processing system situated in a telephony network, an input speech signal that is based on a speech input of a user at a telecommunications terminal, the input speech signal having a first signal quality characteristic as measured at a point in the network other than at the telecommunications terminal; and
generating, based on one or more values of the first signal quality characteristic, a first sidetone signal that is based on the input speech signal, so that when transmitted to the telecommunications terminal, the first sidetone signal arrives at a handset receiver at the telecommunications terminal with a predetermined delay in relation to a second sidetone signal arriving at the handset receiver, the second sidetone signal being generated for the telecommunications terminal and at a point in the network other than at the data-processing system, and the second sidetone signal being based on the input speech signal.

14. The method of claim 13 wherein the first signal quality characteristic pertains to quality of service.

15. The method of claim 13 wherein the first signal quality characteristic pertains to media waveform quality.

16. The method of claim 13 wherein the point in the network at which the second sidetone signal is generated is at the telecommunications terminal itself.

17. The method of claim 13 wherein the generating of the first sidetone signal occurs when signal degradation as represented by the one or more values of the first signal quality characteristic exceeds a first predetermined threshold.

18. The method of claim 17 further comprising adding noise to the first sidetone signal when signal degradation as represented by one or more values of a second signal quality characteristic exceeds a second predetermined threshold.

19. The method of claim 13 wherein the data-processing system is a private-branch exchange that coincides with the point in the network where the first signal quality characteristic is measured.

* * * * *